Figure 1:
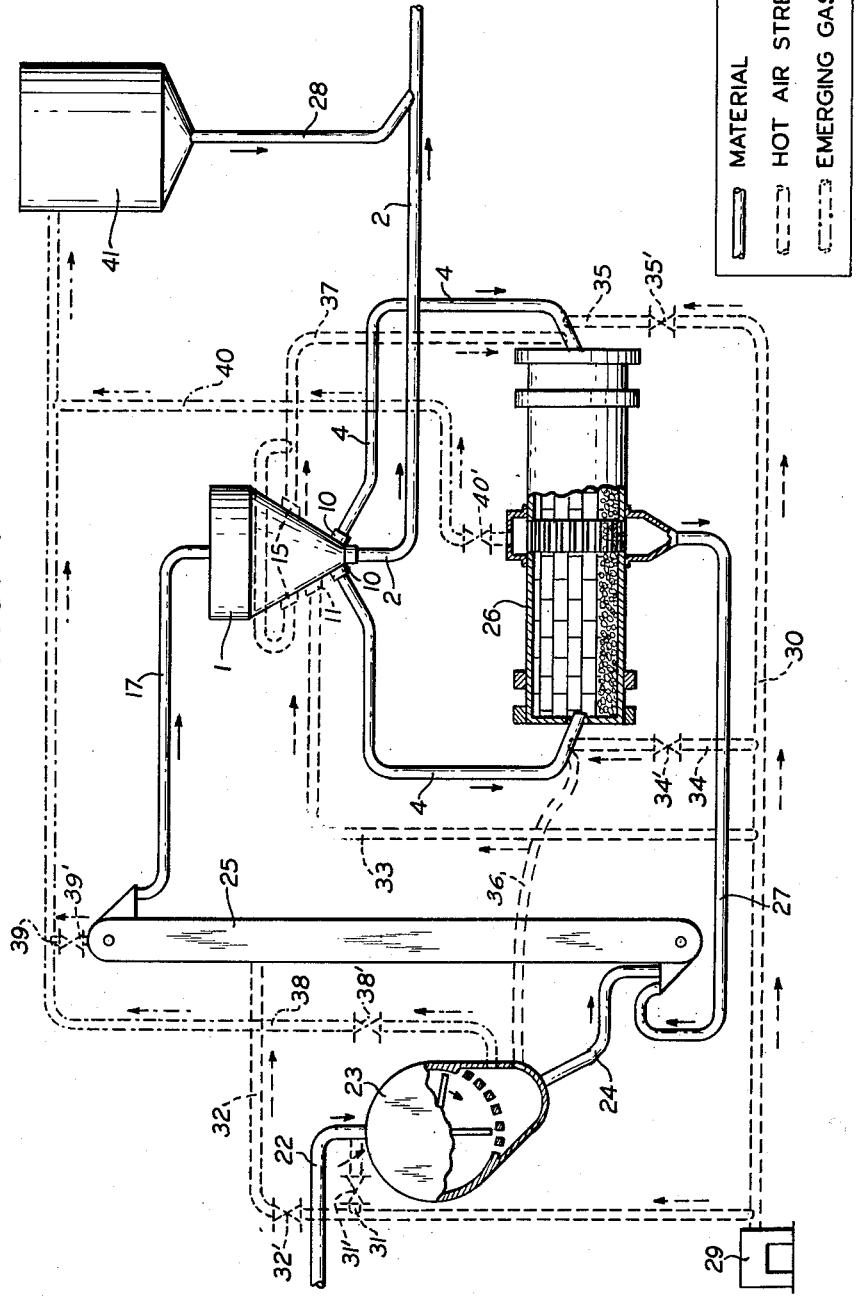

United States Patent Office 3,013,734
Patented Dec. 19, 1961

3,013,734
METHOD OF AND APPARATUS FOR THE DRYING OF GOODS TO BE GROUND IN A GRINDING AND SIFTING APPARATUS
Rudolf Hischmann, Ennigerloh, Westphalia, Germany, assignor to Firma Gebrueder Hischmann, Maschinenfabrik, Ennigerloh, Westphalia, Germany
Filed Apr. 11, 1958, Ser. No. 727,862
Claims priority, application Germany Apr. 11, 1957
7 Claims. (Cl. 241—17)

The present invention relates to a method of and an apparatus for the drying of mineral bodies to be ground in a grinding and sifting apparatus.

The present invention is concerned with the drying of mineral bodies to be ground in a grinding apparatus for simultaneous separation of the mineral bodies to be ground into a portion of fine grain and a portion of coarse grain.

It is one object of the present invention to provide a method of grinding, sifting and practically completely drying of moist bodies to be ground in an economical manner.

In accordance with a known method, plant-moist bodies to be ground, which have been broken up in a hammermill prior to their passing into a wind sifting device, are dried in a special drying kiln, so that the bodies do not stick together in the wind sifting device and a best possible separation of the fine grain from the coarse grain is brought about. This method has, however, not only the drawback, that the specially arranged drying kiln, for instance drying revolving drums, is very expensive and spacious, but, in addition, the drying of the bodies to be ground turned out to be insufficient, since the broken-up and moist bodies to be ground are engaged partly only by the hot drying gases. It is unavoidable in the use of this method, that the bodies to be ground, which are still too moist, enter the wind sifting device and clog up the latter, which leads to appreciable disturbances in the entire operation.

Another method, which is known as "air-stream grinding drying," operates with a hot air stream which is fed through a mill and, thereby, dries the bodies to be ground and feeds the bodies to be ground, which have been reduced to a fineness of a predetermined degree, into a wind sifting device, where a portion of the bodies to be ground which have been insufficiently reduced is removed and returned to the mill. This method has also the drawback that still moist bodies to be ground enter the wind sifting device and clog up the latter. Aside from this bad feature, this method has the additional drawback, that the bodies to be ground cannot be pre-sifted prior to their feeding to the fine mill due to their high moisture content. Rather the portion of fine grain contained in the bodies to be ground must also be fed through the mill for the purpose of drying the same, whereby, however, the efficiency of the mill is worsened.

It is, therefore, one object of the present invention to provide a method of drying of mineral bodies to be ground which avoids the drawbacks and difficulties of the known methods in such a manner that the bodies to be ground are subjected to a first step of prebreaking in a preliminary mill, pre-dried by feeding hot gases into the preliminary mill, separated into a portion of fine grain and a portion of coarse grain in a wind-sifting device, into which a hot air stream is fed in a direction opposite to the direction of movement of the bodies to be ground, and the portion of coarse grain is ground finely in a fine mill, whereto hot air is also fed and then returned to the wind sifting device.

The method of the present invention has at first the advantage that plant-moist bodies to be ground are sifted after a pre-breaking prior to their feeding to the fine mill, so that the latter does not receive any more bodies to be ground which are already sufficiently reduced. This is brought about in such a manner, that the bodies to be ground are surrounded by a hot air stream during their pre-breaking and during their conveyance to the wind sifting device and that the hot air flows around the particles of the bodies to be ground in a counter-stream in the wind sifting device, whereby during the intensive flowing around the best possible exploitation of the heat fed thereto by the hot air is achieved.

A further advantage of the present invention is apparent from the fact that due to the feeding of hot air to the preliminary mill, the conveyance device and the wind sifting device a clogging of the bodies to be ground on the walls is avoided. Advantageously the hot air makes possible a separation of particles of the fine grain which stick together, so that such particles are carried away by all means in the wind sifting device by the air stream and thus join the portion of fine grains. By feeding hot air in a counter-stream into the wind sifting device, it is achieved, that no fine grain particles, which clog together, reach the portion of coarse grains.

Of particular advantage for an apparatus, designed in accordance with the present invention, is the fact that particular drying devices, as for instance, drying revolving drums are no more necessary. Rather in accordance with the present invention, merely a few tubes are required, which feed the hot gases to the individual devices and lead the emerging gases into a dust-separator provided therefor.

Figure 2:
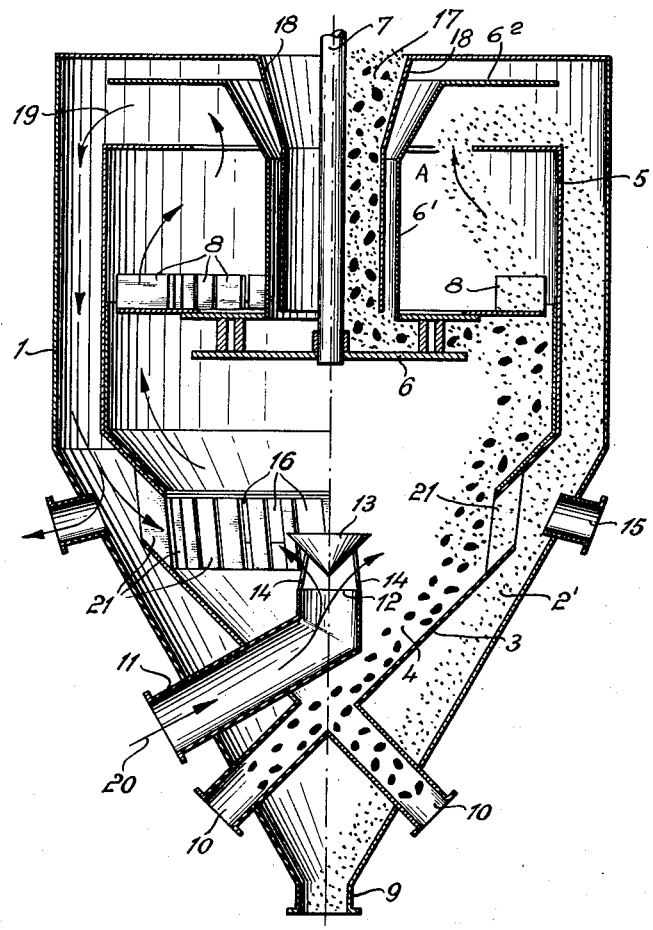

With these and other objects in view which will become apparent in the following detailed description, the present invention will be clearly understood in connection with the accompanying drawings, in which:

FIGURE 1 is a schematic view of the entire grinding and sifting apparatus, wherein the stream of the bodies to be ground is indicated in thick lines, the hot air stream indicated in dotted lines and the stream of emerging gases in point-dotted lines; and FIG. 2 is an axial section of a wind sifting device.

Referring now to the drawings, the apparatus disclosed in FIG. 1 comprises substantially a preliminary mill 23, for instance a hammer-mill, an elevator 25, a wind sifting device 1, a fine mill 26, which is designed in the shown embodiment by example as a compound mill with lateral delivery and a dust separator 41.

The plant-moist bodies are fed in this apparatus to the preliminary mill 23 through the conduit 22 and are reduced therein. The bodies which have been subjected to a preliminary break-up, are now fed through the conduit 24 to the wind sifting device 1 by means of the elevator 25. A separation into coarse grain and fine grain is brought about in the wind sifting device 1. While the fine grain is fed through the conduit 2 to a place for further processing, the coarse grain is fed through the conduit 4 to the fine mill 26, where a fine grinding takes place. The finely ground bodies are returned through the conduit 27 to the wind sifting device 1 by means of the elevator 25.

As hot gases, either hot air produced in an air heater 29 or any hot gases delivered from the processing plant, are used. In cement-works the possibility exists for instance to use the gases emerging from cement-rotary furnaces as hot gases for the present grinding and sifting apparatus. The hot gases are fed through the conduit 30 to the individual devices by means of divisional streams. A hot air stream is fed through the conduit 31 to the preliminary mill 23 by means of an inlet connecting branch 31' provided on the preliminary mill 23. The stream of hot gases through the conduit 33 leads to the wind sifting device 1 and the conduits 34 and 35 feed the streams laterally into the fine mill 26 of known structure, as disclosed in German Patent No. 537,056. Another conduit 32 feeding a stream of hot gases is provided which leads into the elevator 25. The conduit 36 feeding a stream of hot gases, which emerge from the preliminary mill 23, are fed to the fine mill 26, provided the stream in the conduit 36 is not enriched with vapor. The conduit 37 feeding the hot gases emerging from the wind sifting device 1 leads likewise to the fine mill 26.

The conduits 38, 39, and 40 feeding streams of emerging gases are fed to the dust separator 41, wherefrom the removed dust 28 is joined with the portion of the fine grain 2' emerging from the wind sifting device 1 through a conduit 2.

The hot gas streams are fed through conduits 30, 31, 32, 33, 34, 35, 36 and 37 which connect the fine mill 26 with the preliminary mill 23, and the wind sifting device 1 and the hot air producer 29 with the preliminary mill 23, the elevator 25, and the fine mill 26. Conduits are also provided for the emerging gases 38, 39 and 40, which connect the dust-separator 41 with the preliminary mill 23, the elevator 25 and the fine mill 26, respectively. A throttle member is disposed in each of the conduits 31, 32, 34, 35 for the hot gas streams as well as in each of the conduits 38, 39 and 40 for the emerging gas streams. The wind sifting device 1, provided for the sifting of the bodies to be ground is constructed in conventional manner, as may be ascertained from FIG. 2 of the drawings. It comprises substantially an outer receiving funnel 1 for the portion of fine grain and inner receiving funnel 3 for the portion of coarse grain (FIG. 2). A spray plate 6 is disposed in the upper cylindrical part 5 of the receiving funnel 3, which spray plate 6 may be subjected to fast rotation jointly with a cylindrical body 18' by means of a rotating shaft 7 driven by a motor (not shown). A plurality of vanes 8 is also secured to the outer periphery of the spray-plate 6, as well as an upwardly extending cylindrical member 6' which terminates into the likewise rotating disk 62, and a non-rotatable feeding funnel 18 is arranged axially above the spray plate 6, and said vanes 8 rotate with the spray plate 6.

At the lower end of the receiving funnel 1 and of the receiving funnel 3 are disposed one or a plurality of outlet connecting branches 9 and 10 for the portion of fine grain 2' and for the portion of coarse grain 4, respectively. The outlet connecting branch 9 is connected with the conduit 2 for feeding away the fine grain 2'.

An inlet connecting branch 11 for the hot gases, arranged in accordance with the present invention, leads substantially laterally through the receiving funnels 1 and 3. The opening 12 of the inlet connecting branch 11 is disposed centrally inside of the receiving funnel 3 and arranged vertically below the rotating shaft 7 carrying the spray-plate 6.

A conical spray plate 13 is further provided at the inlet opening 12 for the hot gases by means of the upwardly tapered member 14, operating as a support.

Two outlet branch connections 15 for the hot gases are disposed between the outer and inner receiving funnels 1 and 3, whereby openings 16 are provided in the upper conical part of the inner receiving funnel 3, to which openings 16 are secured inwardly directed baffle sheets 21.

The above described apparatus operates in the following manner:

The goods to be ground stored in a bunker (not shown), for instance a raw material used for the manufacture of cement is fed over a feeding device to the hammer mill 23 and reduced or broken up therein. The conduit 31 feeding the hot gas stream leads simultaneously to an inlet connecting branch 31' which is disposed in a charging duct of the preliminary mill 23, so that drying is achieved simultaneously during the breaking-up process. The goods to be ground which have been subjected to a preliminary break-up, are now fed to the elevator 25. In order to prevent any condensation there due to the cooling of the goods to be ground, the conduit 32 for the stream of the hot gases is provided, which amounts to a further feeding of heat thereto. The pre-broken goods are then fed through the conduits 17 to the wind sifting device 1, where they are subjected to a stream of hot gases through the conduit 33. The goods to be ground fall into the receiving funnel 18 and are poured onto the fast rotating spray plate 6. The latter throws at first the goods to be ground outwardly. Due to the circulation of the gas stream 19, the portion of the fine grain 2 is pulled upwardly in the outer receiving funnel 1, where it is deposited. The portion of the coarse grain 4 falls, however, opposite to the gas stream downwardly into the inner receiving funnel 3. The stream of hot gases 20 is fed into the sifting device 1 through the inlet connection branch 11 for the hot gases at a temperature of about 600° C. The stream 20 of the hot gases is directed equally towards the periphery of the inner receiving funnel 3 by means of the spray plate 13.

During this procedure, the stream 20 of hot gases engages at first the portion of coarse grain 4 and dries the latter. Any particles of fine grain which clog together due to humidity are separated again during this drying process and flow into the outer receiving funnel 1 provided for the portion of fine grain 2 with the circulating gas stream 19. The stream 20 of hot gases is then fed away with the circulating gas stream 19 and dries, thereby, the portion of fine grain 2. Due to the continuous feed of the hot gas stream 20 the circulating gas stream 19 is always heated.

For the pressure balance, the cooled gases escape partly through the outlet connection branch 15, while the remaining warm gases are returned through the openings 16 to the inner receiving funnel 3. The baffle sheets 21, provided in the openings 16, prevent the carrying away of the fine grain 2 by the gas stream and the fine grain falls into the receiving funnel 1.

The grain collected in the outer receiving funnel 1 and the inner receiving funnel 3, respectively, is removed in known manner through the outlet connecting branches 9 and 10, respectively, and fed to other processing devices.

The hot gas stream emerging from the outlet connection branch 15 through the conduit 37 is fed to a chamber of a multi-chamber compound mill 26, which receives also a hot air stream through the conduit 35. The hot gas stream fed through the conduit 34, as well as the hot gas stream fed through the conduit 36 from the preliminary mill 23 on the other side of the multi-chamber compound mill 26 causes a further drying of the goods broken-up in the mill 26.

Depending upon the degree of humidity of the goods, a greater or lesser hot gas stream is fed through the conduit 31 into the preliminary mill 23 by means of a throttle member.

A throttle member 32' is also provided in the conduit 32 for the hot gas stream, so that depending upon the degree of humidity and temperature hot gases may be fed into the elevator 25 in required or desired quantities.

A throttle member 38', disposed in the conduit 38 for the gas stream emerging from the preliminary mill 23, serves the purpose to feed a greater or lesser hot gas stream through the conduit 36 into the left chamber of the multi-chamber compound mill 26. In the case that the hot gas stream through the conduit 31 is appreciably cooled or enriched greatly with vapor in the preliminary mill 23, the throttling member therein is widely opened, so that the cooled and humid gas emerges as a gas stream through the conduit 38 into the dust-separator 41. If, however, the humidity content is lower and if the temperature is sufficient for further use, the hot gas stream through the conduit 36 is fed to the mill 26. Complementary to the hot gas stream fed through the conduit 36 available from the preliminary mill 23 and to the hot gas stream fed through the conduit 37 emerging from the wind sifting device 1, it is necessary to feed to the fine mill 26 a greater or lesser amount of fresh hot gases by similar valve means. Throttle members 34' and 35' are also provided for this control in the conduits for the hot gas streams 34 and 35.

The hot gas streams fed through the conduits 34, 35, 36 and 37 are cooled in the fine mill 26 in an economical manner, so that they may be fed as an emerging gas stream through the conduit 40 to the dust separator 41, the conduit 40 having a throttle member 40'. In the embodiment shown by example in the drawings, the gas stream through the conduit 40 emerges through the outlet connecting branch disposed in the center of the fine mill 26, and the conduit 39, having a throttle member 39', feeds the emerging gas stream from the elevator 25.

Finally, means are also provided for feeding the hot gas stream through the conduit in the elevator 25 and at the upper end of the latter a gas stream emerges through the conduit 39, the latter is suitably fed to the dust separator 41.

The present invention is not limited to the embodiment shown by example, rather the construction as well as the arrangement may be varied, without abandoning the scope of the present invention.

Thus, there is, for instance, the possibility to use conveyor devices other than elevators, as for instance pneumatic tubes. Instead of using a hammer mill as a preliminary mill 23, a tubular mill may be provided. The fine mill which in the present embodiment is shown as a two-chamber compound mill with a centrally arranged outlet connecting branch, may be replaced, by example by a one-chamber mill with front inlet and outlet. The outlet connection branch for the hot gases may be arranged by example in the wind sifting device also in the outer receiving funnel provided for the collection of the portion of fine grain or in both receiving funnels.

While I have disclosed one embodiment of the present invention, it is to be understood that this embodiment is given by example only and not in any limiting sense, the scope of the present invention being determined by the objects and the claims.

I claim:

1. A method of breaking and drying goods to be ground in a grinding and sifting apparatus comprising the steps of subjecting said goods first to a preliminary hammer-mill break-up, feeding of hot gases to said goods during said break-up step, separating said goods into portions of fine grain and portions of coarse grain, removing said fine grain portion directly from said first preliminary breaking point, feeding hot gases during said separation step to said goods in a stream moving at least partly opposite to that of said goods, subjecting said portion of coarse grain to a fine tube mill grinding, feeding hot gases to said portion of coarse grain during said finely grinding step, subjecting the coarser of the finely ground goods emerging from said last mentioned step to said before stated separating step, and thereby returning the insufficiently ground goods to said finely grinding step.

2. An apparatus for the drying of goods to be ground comprising a preliminary mill adapted for a preliminary break-up of said goods and having a material charging duct and a material discharging duct, a gas charging duct and a gas discharging duct, said inlet and outlet connection passing hot gases through said preliminary mill, a separate conduit for removal of gases from said preliminary mill, a wind sifting device having an inlet connection feeding hot gases to said wind sifting device, and at least one outlet connection for emerging of said hot gases, a plurality of discharges for coarse goods, and means for feeding said goods from the preliminary mill into said wind sifting device, a fine mill disposed in series downstream of said wind sifting device and comprising a two-chamber compound mill having two oppositely disposed end faces, said two-chamber compound mill having a centrally disposed outlet and an inlet for said goods on each of said end faces, means for feeding said goods from said wind sifting device to said inlets on said end faces, an inlet connection for feeding hot gases to said mill, being disposed in each of the opposite ends of said mill, and an additional conduit for removal of said hot gases from said mill.

3. An apparatus for grinding and drying of goods comprising, in a series arrangement, a hot air producer having a discharge opening, a preliminary mill having an air feeding opening and an air discharge opening, means for feeding said goods to said preliminary mill, a conveyor device having an air feeding opening and an air discharge opening, means for feeding said goods emerging from said preliminary mill to said conveyor device, a wind sifting device having an air feeding opening and an air discharge opening, means for feeding said goods emerging from said conveyor device to said wind sifting device, and a fine mill having three air feeding openings and an air discharge opening, the latter carrying away the finished material, means for feeding said coarsely ground goods emerging from said wind sifting device to said fine mill, means for feeding said fine goods emerging from said wind sifting device, a first conduit connecting said air discharge opening of said hot air producer with said air feeding opening of said preliminary mill, a second conduit connecting said air discharge opening of said hot air producer with said air feeding opening of said conveyor device, a third conduit connecting said air discharge opening of said hot air producer with said air feeding opening of said wind sifting device, a fourth conduit connecting said air discharge opening of said hot air producer with two of said air feeding openings of said fine mill, and a fifth conduit connecting said air discharge openings of said wind sifting device with the third of said air feeding openings of said fine mill, said conduits being adapted for feeding hot air, said second, third, and fourth conduits being in parallel with said preliminary mill, said conveyor device, said wind sifting device and said fine mill.

4. The apparatus, as set forth in claim 3, wherein each of said conduits has a throttle member.

5. The apparatus, as set forth in claim 3, which includes a dust separating and material collecting device having an air inlet opening, and a plurality of additional conduits connecting said dust inlet opening of said dust separating and collecting device with said preliminary mill, with said conveyor device and with said fine mill, respectively, said additional conduits being adapted for feeding hot air emerging from said devices to said dust separating device and collecting finished material from said fine mill.

6. The apparatus, as set forth in claim 5, wherein each of said additional conduits has a throttle member.

7. The apparatus, as set forth in claim 5, which includes a supplemental conduit for feeding said fine goods emerging from said dust separating and material collecting device, and said supplemental conduit being connected with said means for feeding said fine goods emerging from said wind sifting device.

References Cited in the file of this patent

UNITED STATES PATENTS

| | | |
|---|---|---|
| 933,669 | Rusager | Sept. 7, 1909 |
| 1,611,791 | McKinley-Stockton | Dec. 2, 1926 |
| 1,620,982 | Newhouse | Mar. 15, 1927 |
| 1,719,831 | Daniels | July 9, 1929 |
| 1,822,221 | Jones | Sept. 8, 1931 |
| 1,991,583 | McKinley-Stockton | Feb. 19, 1935 |
| 2,274,789 | Horesi | Mar. 3, 1942 |
| 2,351,870 | Newhouse | June 20, 1944 |
| 2,559,551 | Weber | July 3, 1951 |
| 2,561,043 | Ayers | July 17, 1951 |
| 2,658,615 | Ebersole | Nov. 10, 1953 |

(Other references on following page)

UNITED STATES PATENTS

| | | |
|---|---|---|
| 2,662,694 | Olotz | Dec. 15, 1953 |
| 2,716,002 | Craig | Aug. 23, 1955 |

FOREIGN PATENTS

| | | |
|---|---|---|
| K15,217 III/50a | Germany | Aug. 19, 1952 |
| 239,060 | Great Britain | Sept. 3, 1928 |
| 394,840 | Germany | May 2, 1924 |
| 450,987 | Canada | Sept. 7, 1948 |
| 537,056 | Germany | Oct. 30, 1931 |

OTHER REFERENCES

Foreign Abstracts and Patent Review, from Rock Products, August 16, 1930, page 90.

Drying and Grinding in One Operation—With the B and W Closed-Circuit System, Advertisement of Babcock and Wilcox Company, in Rock Products, September 1944, page C-58.